2,849,436

METALLIFEROUS MONOAZO-DYESTUFFS AND PROCESS OF MAKING SAME

Arthur Buehler, Rheinfelden, Switzerland, assignor to Ciba Limited, Basel, Switzerland, a Swiss firm No Drawing. Application February 9, 1953
Serial No. 336,003

Claims priority, application Switzerland
February 11, 1952

11 Claims. (Cl. 260—151)

According to this invention valuable new metalliferous azo-dyestuffs are made by treating a monoazo-dyestuff of the general formula (1)
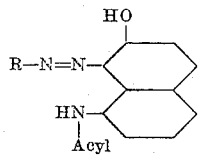

in which R represents an aromatic radical of the benzene series containing a hydroxyl group in ortho-position to the azo linkage on the one hand, with an agent yielding cobalt or chrominum under conditions such that the resulting cobaltiferous or chromiferous azo-dyestuff contains less than one atom of cobalt or chromium in complex union per molecule of monoazo-dyestuff and, on the other, with an alkali to split off the acyl group.

The monoazo-dyestuffs of the above general formula used as starting materials can be made by coupling an ortho-hydroxy-diazo-compound of the benzene series, advantageously one which is free from sulfonic acid groups, with a 1 - acylamino - 7 - hydroxynaphthalene. There are advantageously used as ortho-hydroxy-diazo-compounds for this purpose diazo compounds of ortho-hydroxyamines of the benzene series of which the benzene nucleus contains, in addition to the hydroxyl and amino groups, further substituents, but preferably not sulfonic acid groups. As such substituents there come into consideration, for example, halogen atoms (for example, chlorine), alkyl groups (for example, methyl), alkoxy groups (for example, methoxy), nitro groups, —CO— alkyl groups (for example, —CO—CH$_3$), acylamino groups (for example, acetylamino) and especially sulfone groups (for example, —SO$_2$—CH$_3$), and above all substituted or unsubstituted sulfonic acid amide groups. As examples of such ortho-hydroxy-amines there may be mentioned: 4-methyl-2-amino-1-hydroxybenzene, 4-methoxy-2-amino-1-hydroxybenzene, 4-nitro-2-amino-1-hydroxybenzene, 5-nitro-2-amino - 1 - hydroxybenzene, 6-acetylamino-4-chloro- or 4-nitro-2-amino-1-hydroxybenzene, 6-nitro-4-acetylamino-2-amino-1-hydroxybenzene, 5-nitro-4-chloro-2-amino - 1 - hydroxybenzene, 6-nitro-4-chloro- or -4-methyl-2-amino-1-hydroxybenzene, 3-amino-4-hydroxy-acetophenone, 5-nitro-3-amino-4-hydroxy-acetophenone and 2-amino-1-hydroxybenzene-4-carboxylic acid amide. Especially valuable results are obtained with the following amines: 2-amino-1-hydroxybenzene-4- or -5-methyl sulfone, 2-amino-1-hydroxybenzene-4-benzyl sulfone, 2-amino-1-hydroxybenzene-4- or -5-phenyl sulfone, 6-chloro- or 6-nitro-2-amino-1-hydroxybenzene-4-sulfonic acid amide, 4-chloro- or 4-nitro-2-amino-1-hydroxybenzene-6-sulfonic acid amide, 4-chloro-2-amino - 1 - hydroxybenzene - 5 - sulfonic acid amide, 2-amino-1-hydroxybenzene-4- or -5-sulfonic acid amide and the corresponding -N-methyl-, -N-ethyl-, -N-β-hydroxyethyl-, -N-butyl-, -N-cyclohexyl-, -N-phenyl-, -N-tolyl-, -N-dimethyl-, -N-diethyl-, -N-methyl-phenyl- and -N-benzyl-amides, and also 2-amino-1-hydroxybenzene-4- or -5-sulfonic acid pyrrolidide, 2-amino-1-hydroxybenzene-4- or -5-sulfonic acid morpholide.

The 1-acylamino-7-hydroxynaphthalenes used as coupling components for making the monoazo-dyestuffs contain no further substituents in the naphthalene nucleus. The acyl radicals of these compounds may be of any desired kind. However, there are advantageously used easily accessible N-acyl-derivatives of 1-amino-7-hydroxynaphthalene, in which the acyl radical is of simple constitution, for example, containing only the elements C, H and O. Such acyl radicals are, for example those of the general formula $$-CO-C_{n-1}H_{2n-1}$$

in which $n$ represents a whole number equal to or greater than 1. Among the 1-acylamino-7-hydroxynaphthalenes there are included in this connection 7-hydroxynaphthyl-(1)-carbamic acid esters. As examples of 1-acylamino-7-hydroxynaphthalenes there may be mentioned: 1-para-toluene-sulfonylamino-7 - hydroxynaphthalene, 1 - benzoylamino-7-hydroxynaphthalene and above all 1-formyl-amino-7-hydroxynapthalene, 1-acetylamino - 7 - hydroxynaphthalene, 1-propionylamino-7-hydroxynaphthalene, 1-n-butyrylamino-7-hydroxynaphthalene, 7 - hydroxynaphthyl (1)-carbamic acid methyl ester and 7-hydroxynaphthly (1)-carbamic acid ethyl ester.

The coupling of the ortho-hydroxy-diazo-compounds with the 1-acylamino-7-hydroxynaphthalenes can be carried out by a method in itself known, advantageously in an alkaline medium, for example, a medium rendered alkaline with an alkali carbonate and/or an alkali hydroxide.

After the coupling reaction the dyestuffs may be separated from the coupling mixture by the usual methods for the purpose of metallization and/or splitting off the acyl group. In some cases it is possible to carry out the metallization and splitting off of the acyl group directly in the coupling mixture, that is to say without any intermediate separation.

The treatment with an agent yielding cobalt or chromium is carried out in the present process in such manner that the resulting cobaltiferous or chromiferous azo dyestuffs contains less than one atom of cobalt or chromium in complex union per molecule of monoazo-dyestuff. Accordingly, the metallization is advantageously carried out with such agents yielding cobalt or chromium and by such methods as are suitable for yielding complex cobalt or chromium compounds of the aforesaid constitution. It is generally of advantage to use less than one atomic proportion of cobalt or chromium per molecular proportion of monoazo-dyestuff and to carry out the metallization in an alkaline medium. Consequently, there are especially suitable cobalt and chromium compounds which are stable towards alkaline media, for example, complex cobalt or chromium compounds of aliphatic dicarboxylic acids or hydroxy-carboxylic acids, or complex chromium compounds of aromatic ortho-hydroxy-carboxylic acids. As examples of aliphatic dicarboxylic acids and hydroxy-carboxylic acids there may be mentioned, inter alia, oxalic acid, lactic acid, glycollic acid, citric acid and especially tartaric acid, while among the aromatic ortho-hydroxy-carboxylic acids there may be mentioned, for example, those of the benzene series such as 4-, 5- or 6-methyl-1-hydroxybenzene-2-carboxylic acid and above all 1-hydroxybenzene-2-carboxylic acid itself. As agents yielding cobalt there may also be used simple compounds of divalent cobalt such as cobalt sulfate, cobalt acetate or, if desired, cobalt hydroxide.

The conversion of the dyestuffs into complex cobalt or chromium compounds is carried out with advantage at a raised temperature under atmospheric or superatmospheric pressure, for example, at the boiling temperature of the reaction mixture, if desired, in the presence of suitable additions, for example, in the presence of salts of organic acids, bases, organic solvents or other agents assisting the formation of complexes.

The splitting off of the acyl group by means of an alkali may be carried out before or after, but advantageously during, the metallization. As alkalis there naturally come into consideration those which are capable of hydrolyzing the acyl group in an acylamino group, such, for example, as ammonia and above all potassium hydroxide or sodium hydroxide. The quantity of alkali must be so chosen that an excess of alkali is present in the reaction mixture, that is to say, there must be present more alkali than is necessary for saturating all the acid salt-forming groups present in the reaction mixture. For this purpose it is of advantage to take care that the reaction mixture contains an excess of alkali amounting to at least 0.5 and advantageously 4–6 molecular proportions calculated on the initial monoazo-dyestuff of the Formula 1 above. By suitably choosing the quantity, concentration and period of reaction of the alkali complete splitting off of the acyl group can be achieved. However, it is also possible and is of special advantage in the present process only partially to split off the acyl group, so as to produce mixtures which contain in addition to deacylated products a certain amount of acylated products. This may be of advantage for producing special tints. The treatment with alkali may be conducted, for example, at 100° C. or at a higher temperature, for example, at the boiling temperature of the reaction mixture, for a long period, for example, 1–12 hours, and advantageously about 6 hours.

In one form of the process there is used as starting material a mixture of different metallizable monoazo-dyestuffs of which at least one is of the Formula 1 above. In this case also the treatment with the agent yielding cobalt or chromium is, of course, carried out in such manner that the resulting metalliferous dyestuffs contain less than one atom of cobalt or chromium in complex union per molecule of monoazo-dyestuff, and the splitting off of the acyl group with alkali is carried out before, during or after the metallization. Especially valuable products are obtained in this form of the process by starting from a mixture of two different dyestuffs, both of which are free from sulfonic acid groups and of which at least one, but advantageously both, correspond to the Formula 1 above.

The dyestuffs obtainable by the present process can also be prepared by reacting a metal compound of a monoazo-dyestuff containing one atom of cobalt or chromium in complex union per molecule of monoazo-dyestuff (a 1:1-complex) with a metal-free monoazo-dyestuff, and using at least as the metal-free monoazo-dyestuff or as the metal-free azo-dyestuff of the cobalt or chromium compound a monoazo-dyestuff of the general formula (1)

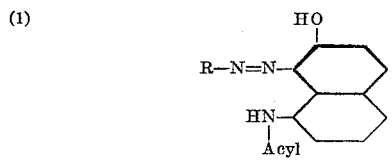

in which R represents an aromatic radical of the benzene series containing a hydroxyl group in ortho-position to the azo linkage, and simultaneously or subsequently splitting off the acyl group by treatment with an alkali.

In the latter form of the process the starting materials may be so chosen that either the monoazo-dyestuff present in the complex cobalt or chromium compound (1:1-complex) or the metal free dyestuff or both correspond to the above general formula.

In this form of the process the 1:1-complexes serving as starting materials can be made by the usual known methods, for example, by reacting the monoazo-dyestuff free from complex-forming metal in an acid medium with an excess of a salt of trivalent chromium such, for example, as chromium fluoride or a chromium sulfate at the boiling temperature or, for example, at a temperature above 100° C.

The reaction of the resulting 1:1-cobalt or chromium complexes with the metal-free dyestuffs is advantageously carried out by reaction in an aqueous medium at the ordinary or a raised temperature.

In a further form of the process a metal compound of a monoazo-dyestuff containing one atom of cobalt or chromium in complex union per molecule of monoazo-dyestuff (1:1-complex) is reacted with a metal-free monoazo-dyestuff, and there is used at least as the metal-free monoazo-dyestuff or as the monoazo-dyestuff of the cobalt or chromium compound a dyestuff of the general formula (2)

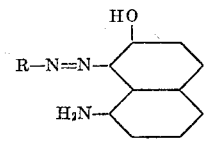

in which R represents an aromatic radical of the benzene series containing a hydroxyl group in orthoposition to the azo linkage.

The products obtained by the foregoing processes are metal-compounds of monoazo-dyestuffs of the general formula

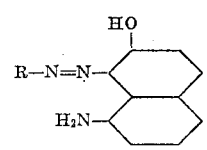

in which R represents an aromatic radical of the benzene series containing a hydroxyl group in ortho-position relatively to the azo linkage, and which metal compounds contain less than one atom of cobalt or chromium bound in complex union per molecule of monoazo-dyestuff.

New and valuable are the products of this kind free from sulfonic acid groups, and in which the radical R, when it contains a chlorine atom, contains a further substituent. Especially valuable are those products which contain as substituents in the radical R, in addition to the hydroxyl group, an alkyl sulfone group, for example, a methyl sulfone group or an aryl, for example, a phenyl, sulfone group, and above all a substituted or unsubstituted sulfonic acid amide group. They are soluble in water and indeed more soluble than the metal-free initial dyestuffs used for making them. They are suitable for printing or dyeing a very wide variety of materials, but especially for dyeing animal materials such as silk, leather and especially wool, but also for dyeing or printing synthetic fibers of a superpolyamide or superpolyurethane. In contradistinction to the chromium compounds of dyestuffs containing sulfonic acid groups which are applied in dyeing advantageously from strongly acid, for example, sulfuric acid, baths, the new metal compounds of monoazo-dyestuffs free from sulfonic acid groups are especially suitable for dyeing from weakly alkaline to neutral to weakly acid, advantageously, acetic acid, baths. The wool dyeings so obtained are distinguished by their good level character, good properties of wet fastness, and their especially favorable shades when viewed in artificial light.

As compared with the corresponding acylated dyestuffs, the products of the present process possess the advantage of a valuable bathochromic effect. They are obtained by the present process in better yield and in a more pure form than by the process in which the non-acylated 1-amino-7-hydroxynaphthalene is used as starting material.

The following examples illustrate the invention, the parts and percentages being by weight unless otherwise stated, and the relationship of parts by weight to parts by volume being the same as that of the kilogram to the liter:

Example 1

20.2 parts of 2-amino-1-hydroxybenzene-4-sulfonic acid methylamide are suspended in 200 parts of water and 15 parts by volume of a 10 N-hydrochloric acid, and diazotized at 5–10° C. with 25 parts by volume of a 4 N-solution of sodium nitrite. The diazo compound, after neutralization by the addition of sodium carbonate, is run into a solution, cooled to 0° C. with ice, and 20.5 parts of 1-acetylamino-7-hydroxynaphthalene in 52 parts by volume of a 2 N-solution of sodium hydroxide and 50 parts by volume of a 2 N-solution of sodium carbonate. When the coupling is complete the precipitated dyestuff is filtered off and washed with a dilute solution of sodium chloride.

41.4 parts of the dyestuff so obtained are suspended in 1200 parts of water. After the addition of 24 parts of sodium hydroxide and 120 parts of a solution of sodium chromosalicylate having a chromium content of 2.6 percent, the whole is raised to the boil and boiled under reflux for about 6 hours. From the clear green-blue solution the dyestuff is completely precipitated by the addition of sodium chloride and neutralization with dilute acetic acid. When dry the dyestuff is a black powder which dissolves in water with a blue coloration and in concentrated sulfuric acid with a violet coloration, and dyes wool from a weakly alkaline, neutral or acetic acid bath full green-grey tints of good fastness to light, decatizing and carbonizing, having good properties of wet fastness and an excellent tint as viewed in artificial light.

By proceeding in the manner described in this example, but conducting the chroming without the addition of sodium hydroxide, there is obtained a dyestuff which dyes wool rather reddish grey tints.

A similar product is obtained by chroming in the manner described above the dyestuff from diazotized 2-amino-1-hydroxybenzene-4-sulfonic acid amide and 7-hydroxynaphthyl-1-carbamic acid methyl ester. The dyestuff so obtained is a grey-black powder which dissolves in water with a blue coloration and in concentrated sulfuric acid with a violet coloration, and dyes wool from a weakly alkaline, neutral or acetic acid bath pure green-grey tints having good properties of fastness and excellent shades as viewed in artificial light. Without the addition of sodium hydroxide there is obtained a dyestuff which dyes wool distinctly more reddish grey tints.

By subjecting in the manner described in this example to chroming accompanied by hydrolysis the monoazo-dyestuffs obtainable from the components specified in columns I and II of the following table, there are obtained complex chromium compounds which dye wool from neutral or weakly acid baths the tints given in column III.

|   | I<br>Diazo component | II<br>Coupling component | III<br>Tint of the dyeing |
|---|---|---|---|
| 1 | 6-Nitro-4-acetylamino-2-amino-1-hydroxybenzene. | 1-n-butyrylamino-7-hydroxynaphthalene. | olive. |
| 2 | 4-nitro-6-acetylamino-2-amino-1-hydroxybenzene. | ......do............. | bluish olive. |
| 3 | 2-amino-1-hydroxybenzene-4-sulfonic acid amide. | 1-benzoylamino-7-hydroxynaphthalene. | green gray. |
| 4 | 2-amino-1-hydroxybenzene-4-sulfonic acid isopropylamide. | 1-carbethoxyamino-7-hydroxynaphthalene. | ...do......... |
| 5 | 2-amino-1-hydroxybenzene-4-methylsulfone. | 1-acetylamino-7-hydroxynaphthalene. | ...do......... |
| 6 | 2-amino-1-oxybenzol-4-sulfonic acid isopropyl amide. | ......do............. | ...do......... |

Example 2

41.2 parts of the dyestuff from diazotized 2-amino-1-hydroxybenzene-5-sulfonic acid amide and 1-acetylamino-7-hydroxynaphthalene are dissolved with the addition of 4 parts of sodium hydroxide in 500 parts of water heated to 80° C., and the whole is mixed with 50 parts of a cobalt sulfate solution containing 3.25 percent of cobalt. After stirring the mixture for ½ hour at 70–80° C., the metallization is complete. To the resulting violet dyestuff solution there are added 16 parts of sodium hydroxide and the whole is boiled under reflux for about 6 hours. The dyestuff can be obtained by neutralizing the mixture with dilute acetic acid and evaporation. It dyes wool from weakly alkaline, neutral or acetic acid baths reddish blue tints having good properties of fastness.

By omitting the after-treatment with sodium hydroxide a dyestuff is obtained which dyes wool pure violet tints.

Example 3

20.7 parts of the dyestuff from diazotized 2-amino-1-hydroxybenzene-4-sulfonic acid methylamide and 1-acetyl-amino-7-hydroxynaphthalene and 21.1 parts of the dyestuff from diazotized 2-amino-1-hydroxybenzene-4-sulfonic acid amide and 1-(4'-chlorophenyl)-3-methyl-5-pyrazolone, both dyestuffs being in the form of moist pastes (filter cakes), are suspended in 600 parts of water, dissolved by the addition of 8 parts of sodium hydroxide, and the mixture is heated to 80° C. 100 parts of a solution, having a temperature of 80° C., of cobalt sulfate having a cobalt content of 3.25 percent, are added to the resulting brown solution. After stirring for about ½ hour at 80° C., the metallization is complete. By the addition of sodium chloride the cobaltiferous mixed complex is completely precipitated. After being filtered off, the dyestuff paste is suspended in 1000 parts of water, then mixed with 12 parts of sodium hydroxide and boiled for about 6 hours under reflux. By the addition of sodium chloride and neutralization with dilute acetic acid the dyestuff is completely precipitated and is then filtered off. When dry it is a brown-black powder which dissolves in water with a brown yellow coloration and in concentrated sulfuric acid with a red-orange coloration, and dyes wool from weakly alkaline, neutral or acetic acid baths full brown tints of an olive shade having good properties of fastness.

By omitting the alkaline after-treatment there is obtained a dyestuff which dyes wool reddish brown tints.

Example 4

0.5 part of the cobaltiferous dyestuff obtainable as described in Example 2 is dissolved in 4000 parts of water, 10 parts of crystalline sodium sulfate are added, and 100 parts of well wetted wool are entered at 40–50° C., into the resulting dyebath. There are then added 2 parts of acetic acid of 40 percent strength, the bath is raised to the boil in the course of ½ hour and dyeing is carried on for ¾ hour at the boil. Finally the wool is rinsed with cold water and dried. There is obtained a uniform reddish blue dyeing of good fastness to washing, having an excellent shade in artificial light and remarkable fastness to light.

The same result is obtained when no acetic acid is added to the dyebath.

A reddish blue dyeing is also obtained when 100 parts of nylon fiber is used instead of 100 parts of wool.

What is claimed is:

1. A member selected from the group consisting of a cobalt and a chromium compound containing substantially one metal atom bound in complex union with two molecules of a monoazo-dyestuff free from sulfonic acid and carboxylic acid groups, which corresponds to the formula

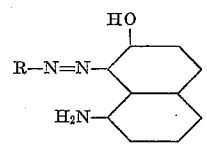

in which R represents a hydroxybenzene radical bound to the azo-linkage in ortho-position to its hydroxyl group and containing a member selected from the group consisting of a sulfone group and a sulfonic acid amide group.

2. A complex chromium compound containing substantially one atom of chromium in complex union with two molecules of a monoazo-dyestuff of the formula

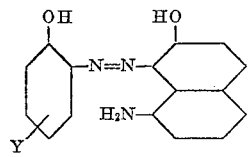

wherein Y represents a sulfonic acid amide group.

3. The complex chromium compound containing one atom of chromium in complex union with two molecules of the monoazo-dyestuff of the formula

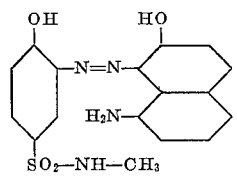

4. The complex chromium compound containing one atom of chromium in complex union with two molecules of the monoazo-dyestuff of the formula

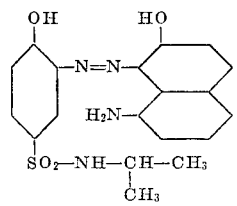

5. The complex chromium compound containing one atom of chromium in complex union with two molecules of the monoazo-dyestuff of the formula

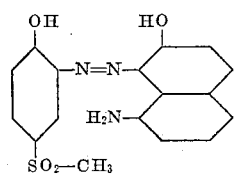

6. A process which comprises heating in the presence of an excess of at least 0.5 and at most 6 molecular proportions of alkali one molecular proportion of a monoazo dyestuff free from sulfonic and carboxylic acid groups, which corresponds to the formula

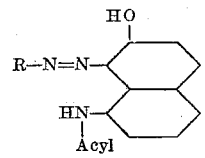

in which the acyl group contains only carbon, hydrogen and oxygen atoms and R represents a hydroxybenzene radical bound to the azo-linkage in ortho-position to its hydroxyl group and containing a member selected from the group consisting of a sulfone group and a sulfonic acid amide group, with less than one molecular proportion of a complex chromium compound of an aromatic ortho-hydroxy-carboxylic acid.

7. A process which comprises heating in the presence of an excess of at least 0.5 and at most 6 molecular proportions of alkali one molecular proportion of a monoazo-dyestuff of the formula

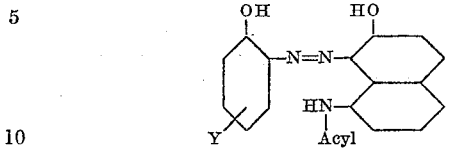

wherein the acyl group contains only carbon, hydrogen and oxygen atoms and Y represents a sulfonic acid amide group, with less than one molecular proportion of a complex chromium compound of an aromatic ortho-hydroxy-carboxylic acid.

8. A process which comprises heating in the presence of an excess of at least 0.5 and at most 6 molecular proportions of alkali one molecular proportion of the monoazo-dyestuff of the formula

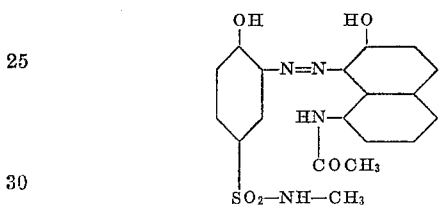

with less than one molecular proportion of the complex chromium compound of 2-hydroxybenzene-1-carboxylic acid.

9. A process which comprises heating in the presence of an excess of at least 0.5 and at most 6 molecular proportions of alkali one molecular proportion of the monoazo-dyestuff of the formula

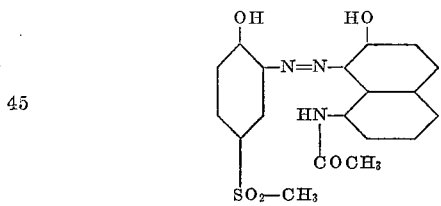

with less than one molecular proportion of the complex chromium compound of 2-hydroxybenzene-1-carboxylic acid.

10. A process which comprises heating in the presence of an excess of at least 0.5 and at most 6 molecular proportions of alkali one molecular proportion of the monoazo-dyestuff of the formula

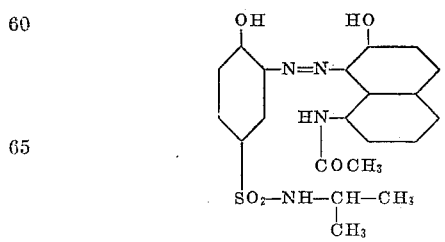

with less than one molecular proportion of the complex chromium compound of 2-hydroxybenzene-1-carboxylic acid.

11. A process which comprises heating in the presence of an excess of at least 0.5 and at most 6 molecular proportions of alkali one molecular proportion of the monoazo-dyestuff of the formula
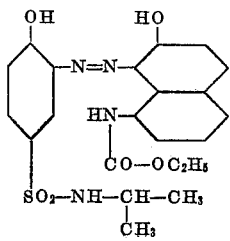
with less than one molecular proportion of the complex chromium compound of 2-hydroxybenzene-1-carboxylic acid.
References Cited in the file of this patent
UNITED STATES PATENTS
| | | |
|---|---|---|
| 1,835,821 | Straub et al. | Dec. 8, 1931 |
| 1,925,434 | Clingestein | Sept. 5, 1933 |
| 2,193,996 | Zwilgmeyer | Mar. 19, 1940 |
| 2,551,056 | Schetty | May 1, 1951 |
| 2,610,175 | Widmer | Sept. 9, 1952 |